United States Patent
Nishioka (10) Patent No.: US 9,816,837 B2
(45) Date of Patent: Nov. 14, 2017

(54) MAGNETIC ANGLE DETECTOR (71) Applicant: FANUC CORPORATION, Yamanashi (JP)

(72) Inventor: Akira Nishioka, Yamamashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/537,020

(22) Filed: Nov. 10, 2014

(65) Prior Publication Data
US 2015/0130452 A1 May 14, 2015

(30) Foreign Application Priority Data

Nov. 11, 2013 (JP) ................................ 2013-233489

(51) Int. Cl.
*G01D 5/12* (2006.01)
*G01D 5/14* (2006.01)

(52) U.S. Cl.
CPC .................................. *G01D 5/147* (2013.01)

(58) Field of Classification Search
CPC .......... G01D 5/12; G01D 5/244; G01D 5/145; G01D 18/00; G01D 5/14; G01P 3/44; G01P 13/00; G01P 3/488; G01P 21/02; G01P 3/487; G01R 33/0023; G01R 33/06; G01R 23/005; G01R 33/07; A63H 30/04; A63H 27/02; G05D 3/14
USPC ..................................................... 324/207.25
See application file for complete search history.

(56) References Cited

U.S. PATENT DOCUMENTS

| | | | | |
|---|---|---|---|---|
| 2002/0175673 A1* | 11/2002 | Butzmann | ............ | G01D 5/2452 324/174 |
| 2005/0127907 A1* | 6/2005 | Shiraga | .................... | G01D 5/04 324/207.25 |
| 2009/0015248 A1* | 1/2009 | Moura | ................. | G01D 5/2451 324/207.26 |
| 2012/0210811 A1* | 8/2012 | Nishioka | ............. | F02N 11/0851 74/405 |
| 2013/0141087 A1* | 6/2013 | Odaka | ................ | G01D 5/24442 324/207.25 |

FOREIGN PATENT DOCUMENTS

| | | |
|---|---|---|
| DE | 3201811 A1 | 9/1983 |
| JP | 8122011 A | 5/1996 |

(Continued)

OTHER PUBLICATIONS

Partial English Machine Translation for Japanese Publication No. 2006-520013, published Aug. 31, 2006, 8 pages.

(Continued)

*Primary Examiner* — Alesa Allgood
*Assistant Examiner* — Brent J Andrews
(74) *Attorney, Agent, or Firm* — Fredrikson & Byron, P.A.

(57) ABSTRACT

A magnetic angle detector (10) includes a detected object (20a) including a plurality of concave and convex parts (21a) formed at a predetermined pitch on an outer peripheral surface, and a detection body (30a) disposed to face an outer peripheral surface of the detected object. The detection body is a polyhedron, and at least two magnetic detection units (34a and 34b) matching a different detected object are arranged on one plane of the polyhedron. The at least two magnetic detection units are arranged rotationally symmetrically around an arbitrary axis of the detection body.

5 Claims, 9 Drawing Sheets

(56) References Cited

FOREIGN PATENT DOCUMENTS

| | | | | |
|---|---|---|---|---|
| JP | 08-178692 A | | 7/1996 | |
| JP | 08178692 A | * | 7/1996 | ............ G01D 5/245 |
| JP | 2001-056206 A | | 2/2001 | |
| JP | 2004-055316 A | | 2/2004 | |
| JP | 2004055316 A | * | 2/2004 | ............ G01R 7/30 |
| JP | 2004-215441 A | | 7/2004 | |
| JP | 2004-257850 A | | 9/2004 | |
| JP | 2006-520013 A | | 8/2006 | |
| JP | 2009-228762 A | | 10/2009 | |
| JP | 2012-033370 A | | 2/2012 | |
| JP | 2013-117429 A | | 6/2013 | |

OTHER PUBLICATIONS

English Machine Translation of Japanese Publication No. 8-122011, published May 17, 1996, 7 pgs.

English Machine Translation for Japanese Patent Publication No. 08-178692 published Jul. 12, 1996, 8 pages.

English Machine Translation for Japanese Patent Publication No. 2001-056206 published Feb. 27, 2001, 8 pages.

English Machine Translation for Japanese Patent Publication No. 2004-055316 published Feb. 19, 2004, 12 pages.

English Machine Translation for Japanese Patent Publication No. 2004-215441 published Jul. 29, 2004, 14 pages.

English Machine Translation for Japanese Patent Publication No. 2004-257850 published Sep. 16, 2004, 10 pages.

English Machine Translation for Japanese Patent Publication No. 2009-228762 published Oct. 8, 2009, 13 pages.

English Machine Translation for Japanese Patent Publication No. 2012-033370 published Feb. 16, 2012, 19 pages.

English Machine Translation for Japanese Patent Publication No. 2013-117429 published Jun. 13, 2013, 23 pages.

English Machine Translation for German Publication No. 3201811 A1, published Sep. 8, 1983, 7 pgs.

* cited by examiner

MAGNETIC ANGLE DETECTOR

BACKGROUND OF THE INVENTION

1. Field of the Invention

The present invention relates to a magnetic angle detector capable of detecting a rotational angle of an object to be detected based on a change of magnetic flux density.

2. Description of the Related Art

A magnetic angle detector has been conventionally used to measure an angle of an output shaft of a motor. For example, Japanese Laid-open Patent Publication No. 08-122011 discloses a detector that includes detection elements arranged on a peripheral surface of a ring magnetic body.

Figure 11A:
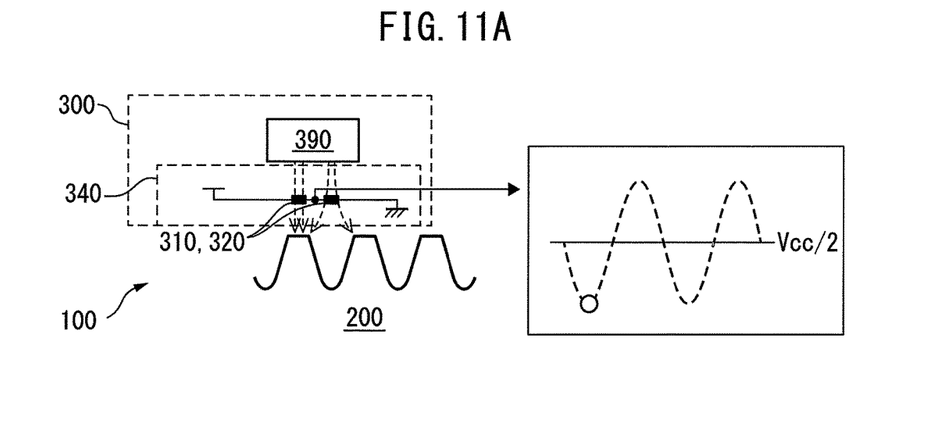
FIG. 11A is a diagram illustrating a magnetic angle detector and output thereof at a given time.

FIG. 11A illustrates the magnetic angle detector and output thereof at a given time. As illustrated in FIG. 11A, the magnetic angle detector 100 includes a gear-shaped detected object 200, which is rotatably disposed around a rotational axis O (not illustrated). A plurality of concave and convex parts are formed at a predetermined pitch on a peripheral surface of the detected object 200. A detection body 300 that includes a magnet 390 and a magnetic detection unit 340 inside is disposed to face the peripheral surface of the detected object 200.

As illustrated in FIG. 11A, the magnetic detection unit 340 includes two magnetic detection elements 310 and 320. The two magnetic detection elements 310 and 320 are positioned between the magnet 390 and the detected object 200. A voltage Vcc is applied to the two magnetic detection elements 310 and 320.

Figure 11B:
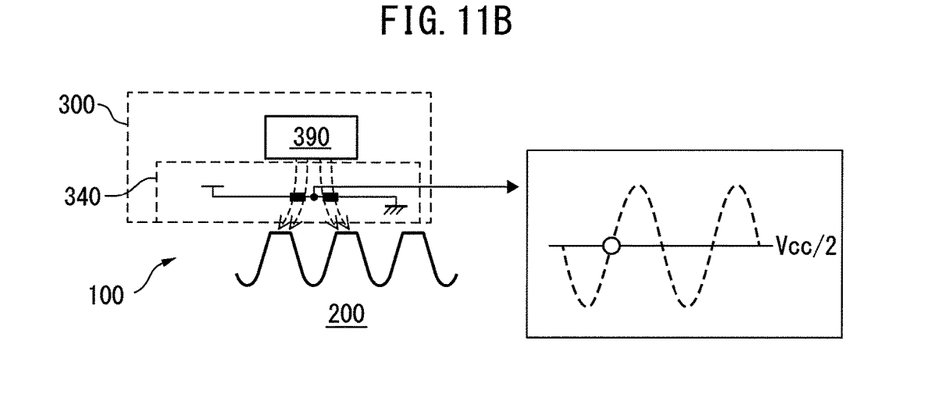
FIG. 11B, which is similar to FIG. 11A, is a diagram illustrating a state after passage of a predetermined time from that illustrated in FIG. 11A.
Figure 11C:
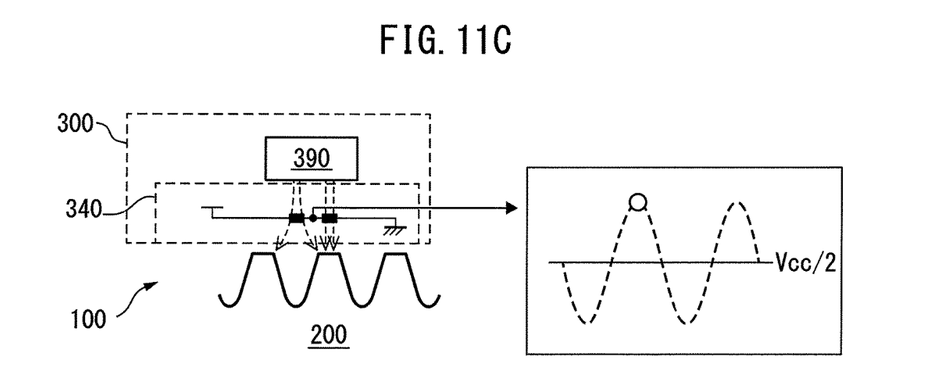
FIG. 11C, which is similar to FIG. 11A, is a diagram illustrating a state after passage of a predetermined time from that illustrated in FIG. 11B.

FIG. 11B, which is similar to FIG. 11A, illustrates a state after passage of a predetermined time from that illustrated in FIG. 11A. FIG. 11C, which is similar to FIG. 11A, illustrates a state after passage of a predetermined time from that illustrated in FIG. 11B. As can be understood from FIGS. 11A to 11C, because of the plurality of concave and convex parts formed on the peripheral surface of the detected object 200, when the detected object 200 rotates around the rotational axis O (not illustrated), magnetic flux density between the magnet 390 and the detected object 200 changes. The magnetic detection elements 310 and 320 output such a change of the magnetic flux density as an output signal. Accordingly, the magnetic angle detector 100 can detect a rotational angle position of the detected object 200.

The magnetic detection elements 310 and 320 of the magnetic detection unit 340 are configured to match a plurality of concave and convex parts at a specific pitch of the detected object 200. In other words, the magnetic detection unit 340 may not be used for other detected objects including a plurality of concave and convex parts different in size of pitches.

Thus, when use of another detected object is requested, another detection body that includes magnetic detection elements matching a pitch of the other detected object must be prepared. In other words, according to the pitch type of the plurality of concave and convex parts of the detected object, a detection body matching the pitch must be manufactured and prepared. As a result, the number of manufacturing steps increases, and component management becomes complex.

The present invention has been developed in view of the aforementioned problems, and it is the object of the present invention to provide a magnetic angle detector that includes a detection body usable even when pitches of concave and convex parts of a detected object are different.

SUMMARY OF THE INVENTION

According to a first aspect of the present invention, to achieve the object, a magnetic angle detector is provided that includes a detected object including a plurality of concave and convex parts formed at a predetermined pitch on an outer peripheral surface, and a detection body disposed to face the outer peripheral surface of the detected object, wherein the detection body is a polyhedron, and at least two magnetic detection units matching a different detected object are arranged on one plane of the polyhedron, the at least two magnetic detection units being arranged rotationally symmetrically around an arbitrary axis of the detection body.

According to a second aspect of the present invention, in the first aspect of the invention, a hole or a projection is formed on the plane of the detection body, and a projection or a hole corresponding to the hole or the projection is formed in an installation place in which the detection body is installed.

According to a third aspect of the present invention, a magnetic angle detector is provided that includes a detected object including a plurality of concave and convex parts formed at a predetermined pitch on an outer peripheral surface, and a detection body disposed to face the outer peripheral surface of the detected object, wherein the detection body is a polyhedron, and at least two magnetic detection units matching a different detected object are arranged on one plane of the polyhedron, the at least two magnetic detection units being respectively arranged in a place equidistant from an edge of the plane corresponding to each of the at least two magnetic detection units.

According to a fourth aspect of the present invention, in the third aspect of the invention, a hole or a projection is formed on the plane of the detection body, and a projection or a hole corresponding to the hole or the projection is formed in an installation place in which the detection body is installed.

BRIEF DESCRIPTION OF THE DRAWINGS

These objects, features and advantages, and the other objects, features and advantages of the present invention will become more apparent from the following detailed description of exemplary embodiments of the present invention with reference to the attached drawings, in which.

DETAILED DESCRIPTION

Hereinafter, the exemplary embodiments of the present invention will be described with reference to the accompanying drawings. In the drawings, similar members are denoted by similar reference numerals. For easier understanding, reduction scales are appropriately changed in the drawings.

Figure 1:
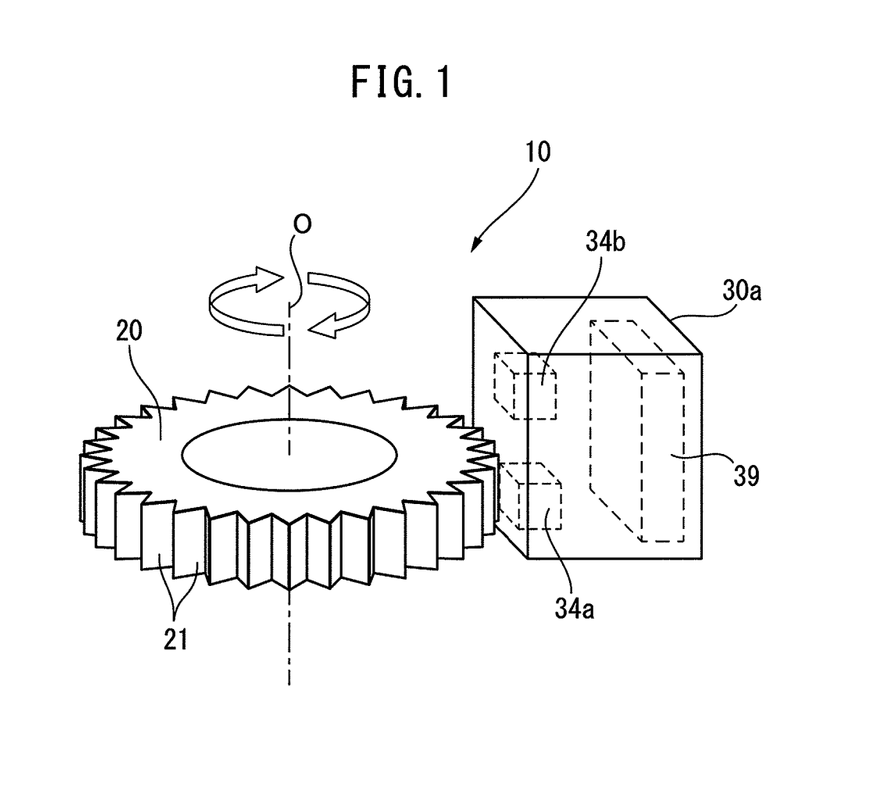
FIG. 1 is a perspective view illustrating a magnetic angle detector according to the present invention.

FIG. 1 is a perspective view illustrating a magnetic angle detector according to the present invention. As illustrated in FIG. 1, the magnetic angle detector 10 includes a gear-shaped detected object 20 rotatably disposed around a rotational axis O. A plurality of concave and convex parts 21 are formed at a predetermined first pitch on a peripheral surface of the detected object 20. A detection body 30a, that includes a magnet 39 and first and second magnetic detection units 34a and 34b inside, is disposed to face the peripheral surface of the detected object 20. As described above, each of the first and second magnetic detection units 34a and 34b includes two magnetic detection elements. Notably, other magnetic detection units 34c to 34e described below are similarly configured.

As illustrated in FIG. 1, the first and second magnetic detection units 34a and 34b are arranged in parallel with a predetermined space in a direction parallel to the rotational axis O. The magnet 39 is disposed adjacently to the first and second magnetic detection units 34a and 34b. A size of the magnet 39 is preferably equal to or larger than an area including the plurality of magnetic detection units 34a and 34b and a gap between the plurality of magnetic detection units.

In FIG. 1, the detection body 30a is disposed so that only one magnetic detection unit 34a can be positioned between the magnet 39 and the detected object 20. In other words, the peripheral surface of the detected object 20 is disposed at a height corresponding to the magnetic detection unit 34a. The peripheral surface of the detected object 20 is not disposed at a height corresponding to the other magnetic detection unit 34b.

The plurality of concave and convex parts 21 are formed on the peripheral surface of the detected object 20. Accordingly, when the detected object 20 rotates around the rotational axis O, magnetic flux density between the magnet 39 and the detected object 20 changes. A magnetic detection element (not illustrated) in the magnetic detection unit 34a outputs the change of the magnetic flux density as an output signal, thus enabling the magnetic angle detector 10 to detect a rotational angle position of the detected object 20.

Figure 2:
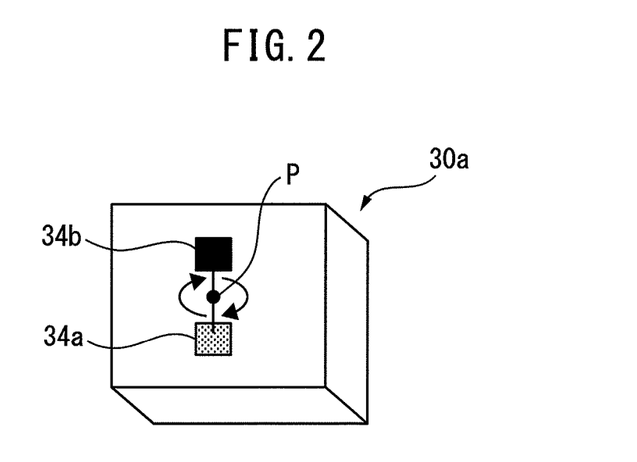
FIG. 2 is an enlarged view illustrating a detection body according to a first embodiment of the present invention.

FIG. 2 is an enlarged view illustrating a detection body according to a first embodiment of the present invention. The detection body 30a illustrated in FIGS. 1 and 2 is a square pole, and an end surface thereof is roughly square or rectangular. First and second magnetic detection units 34a and 34b are arranged on one end surface of the detection body 30a. In this regard, the first and second magnetic detection units 34a and 34b may be arranged on a front face of the end surface or buried in the end surface. The first and second magnetic detection units 34a and 34b are rotationally symmetrically arranged around a given axis of the detection body 30a, for example, a rotational center P. In FIG. 2, the first and second magnetic detection units 34a and 34b are arranged to face each other. However, the first and second magnetic detection units 34a and 34b may not face each other.

Figure 3A:
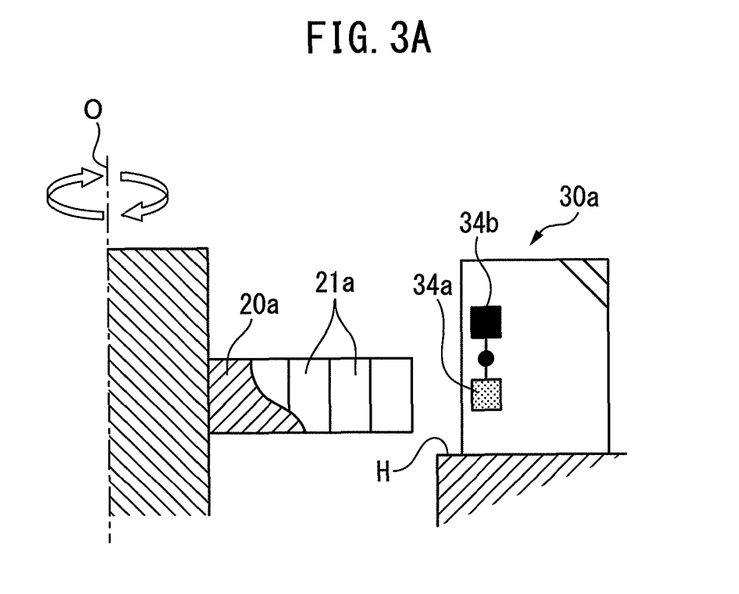
FIG. 3A is a partial enlarged view illustrating a first application example of the magnetic angle detector according to the first embodiment.

FIG. 3A is a partial enlarged view illustrating a first application example of the magnetic angle detector according to the first embodiment. As illustrated in FIG. 3A, in the first application example, a rotational angle of a detected object 20a that includes a plurality of concave and convex parts 21a formed at a first pitch is detected. The detection body 30a is disposed in an installation place H such as housing so that only a first magnetic detection unit 34a can face the peripheral surface of the detected object 20a.

It is assumed that two magnetic detection elements (not illustrated) in the first magnetic detection unit 34a are configured to match the first pitch of the detected object 20a. Accordingly, the first magnetic detection unit 34a can, as described above, detect a rotational angle of the detected object 20a by appropriately understanding a change of magnetic flux density when the detected object 20a rotates around a rotational axis O. Notably, in the first application example, a second magnetic detection unit 34b is located above the detected object 20a, thus not contributing to detection of the rotational angle of the detected object 20a.

Figure 3B:
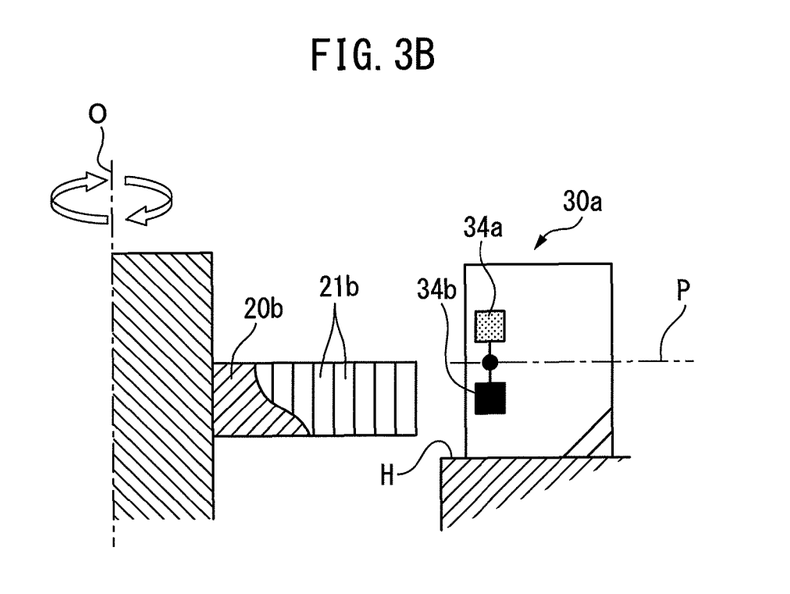
FIG. 3B is a partial enlarged view illustrating a second application example of the magnetic angle detector according to the first embodiment.

In a second application example, a rotational angle of a detected object 20b different from the detected object 20a is detected. In this case, the detected object 20a is removed to locate the detected object 20b on the rotational axis.

FIG. 3B is a partial enlarged view illustrating the second application example of the magnetic angle detector according to the first embodiment. As illustrated in FIG. 3B, a plurality of concave and convex parts 21b of the detected object 20b are disposed at a predetermined second pitch smaller than the first pitch of the detected object 20a. In the second application example, the detection body 30a is rotated by 180° around the rotational center P. The detection body 30a is accordingly disposed in the installation place H in a vertically opposite manner to the arrangement in the first application example. As a result, only the second magnetic detection unit 34b faces a peripheral surface of the detected object 20b.

It is assumed that two magnetic detection elements (not illustrated) in the second magnetic detection unit 34b are configured to match the second pitch of the detected object 20b. Accordingly, the second magnetic detection unit 34b can, as described above, detect a rotational angle of the detected object 20b by appropriately understanding a change of magnetic flux density when the detected object 20b rotates around the rotational axis O. In the second application example, the first magnetic detection unit 34a is located above the detected object 20b, thus giving no contribution to detection of the rotational angle of the detected object 20b.

Figure 4A:
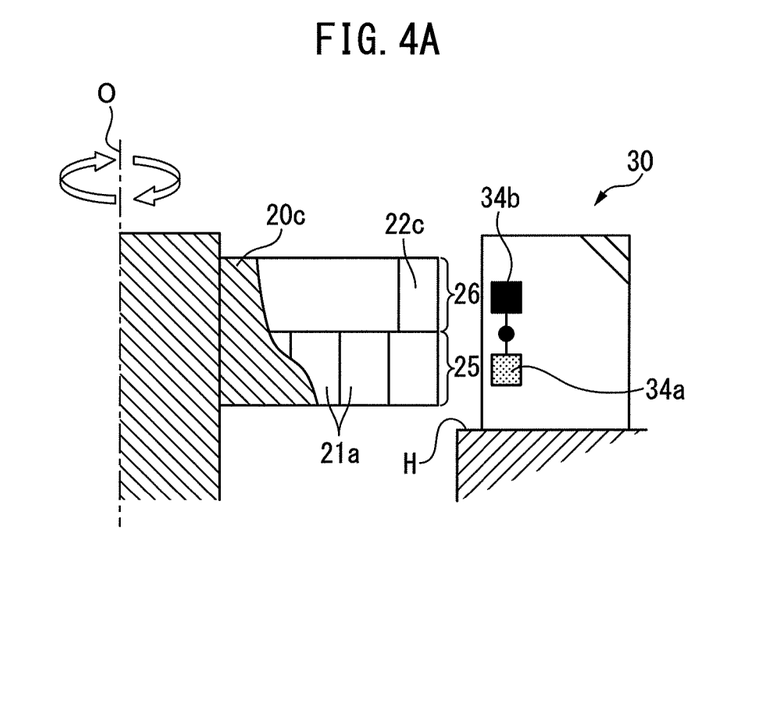
FIG. 4A is a partial enlarged view illustrating a third application example of the magnetic angle detector according to the first embodiment.
Figure 4B:
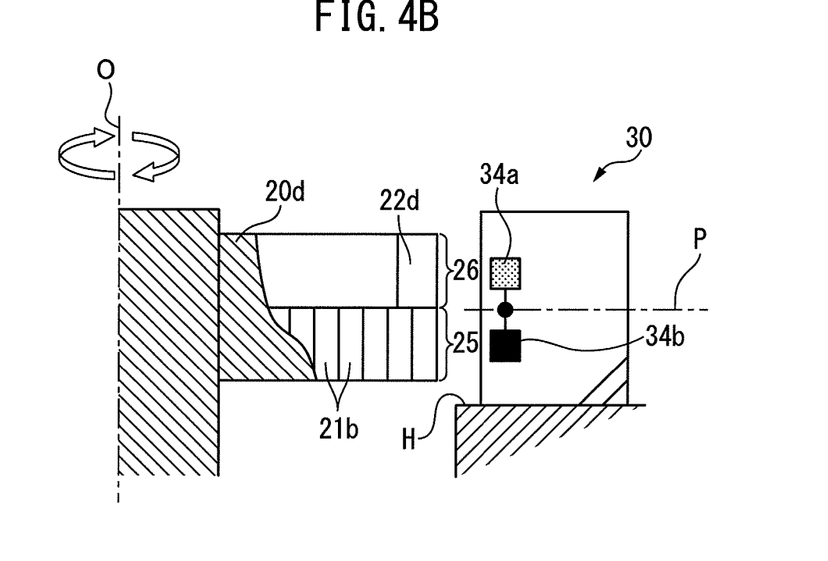
FIG. 4B is a partial enlarged view illustrating a fourth application example of the magnetic angle detector according to the first embodiment.

FIGS. 4A and 4B are partial enlarged views respectively illustrating a third application example and a fourth application example of the magnetic angle detector according to the first embodiment. In a detected object 20c illustrated in FIG. 4A, a lower part 25 used for detecting a rotational angle and an upper part 26 used for detecting one rotation of the detected object 20c are integrated.

The lower part 25, which is configured as in the case of the detected object 20a illustrated in FIG. 3A, includes a plurality of concave and convex parts 21a formed at the first pitch on a peripheral surface thereof. As can be understood from FIG. 4A, the upper part 26 includes a single projection 22c formed to project radially outward. In the third application example, a detection body 30a is disposed in an installation place H in a manner that a first magnetic detection unit 34a of the detection body 30a faces the peripheral surface of the lower part 25 and a second magnetic detection unit 34b of the detection body 30a faces a peripheral surface of the upper part 26.

Two magnetic detection elements (not illustrated) in the first magnetic detection unit 34a are configured to match the first pitch of the plurality of concave and convex parts 21a. Accordingly, when the detected object 20c rotates, the first magnetic detection unit 34a detects a rotational angle of the detected object 20c as described above. The second magnetic detection unit 34b detects one rotation of the detected object 20c through the projection 22c. The second magnetic detection unit 34b, which is configured to match the second pitch, is used for detecting the single projection 22c.

FIG. 4B is the partial enlarged view illustrating the fourth application example of the magnetic angle detector according to the first embodiment. When a rotational angle of a detected object 20d is detected, the detected object 20c is removed to locate the detected object 20d on a rotational axis. As illustrated in FIG. 4B, in the detected object 20d, a lower part 25 used for detecting a rotational angle and an upper part 26 used for detecting one rotation of the detected object 20d are integrated.

The lower part 25, which is configured as in the case of the detected object 20b illustrated in FIG. 3B, includes a plurality of concave and convex parts 21b formed at the second pitch on a peripheral surface thereof. As can be understood from FIG. 4B, the upper part 26 includes a single projection 22d formed to project radially outward. As illustrated in FIG. 4B, in the fourth application example, a detection body 30a is disposed in an installation place H in a manner that a second magnetic detection unit 34b of the detection body 30a faces the peripheral surface of the lower part 25 and a first magnetic detection unit 34a of the detection body 30a faces a peripheral surface of the upper part 26. In other words, after the detected object 20c is replaced by the detected object 20d from the state illustrated in FIG. 4A, the detection body 30a may be rotated around a rotational center P by an appropriate angle, for example, 180°.

Two magnetic detection elements (not illustrated) in the second magnetic detection unit 34b are configured to match the second pitch of the plurality of concave and convex parts 21b. Accordingly, when the detected object 20d rotates, the second magnetic detection unit 34b detects a rotational angle of the detected object 20d as described above. The first magnetic detection unit 34a detects one rotation of the detected object 20d through the projection 22d. The first magnetic detection unit 34a, which is configured to match the first pitch, can detect the single projection 22d.

Thus, according to the first embodiment of the present invention, the magnetic detection units 34a and 34b matched with the pitches of the plurality of concave and convex parts of the detected object 20a to be detected by rotating the detection body 30a around the rotational center P can be employed. The same detection body 30a can accordingly be used even when detecting a rotational angle of the detected object 20b different in pitch of the plurality of concave and convex parts. This eliminates having to prepare another detection body including another magnetic detection unit 34b even when the pitch of the plurality of concave and convex parts of the detected object 20b is different. As a result, the number of manufacturing steps can be reduced, and component management can be simplified. Even when the detection body 30a rotates around the rotational center P, positional relationship between the detected objects 20a and 20b and the plane of the detection body 30a are equal to each other. This eliminates necessity of changing a fitting position of the detection body 30a in the installation place H.

Figure 5A:
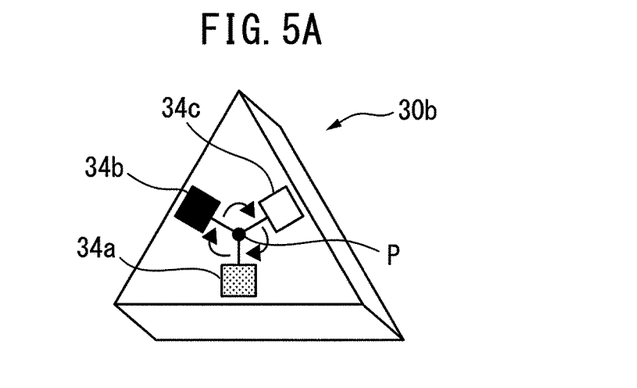
FIG. 5A is an enlarged view illustrating another detection body according to the first embodiment.

FIG. 5A is an enlarged view illustrating another detection body according to the first embodiment. The detection body 30b is formed into a triangle pole to be rotatable around a rotational center P. An end surface of the detection body 30b is roughly equilateral-triangular. As can be understood from FIG. 5A, first to third magnetic detection units 34a to 34c are arranged on one end surface of the detection body 30b. The first to third magnetic detection units 34a to 34c are rotationally symmetrically arranged around a given axis of the detection body 30b, for example, the rotational center P.

Figure 5B:
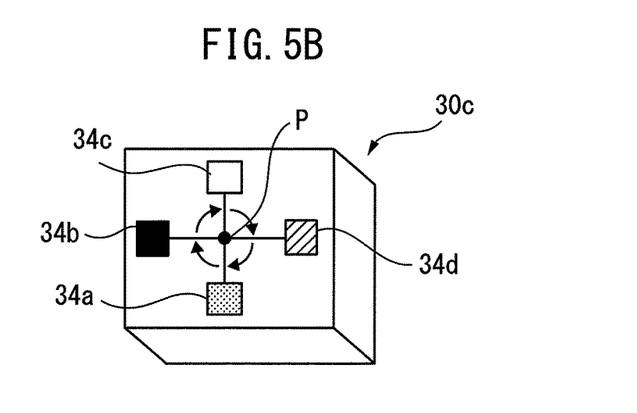
FIG. 5B is an enlarged view illustrating yet another detection body according to the first embodiment.

Similarly, FIG. 5B illustrates yet another detection body 30c formed into a square pole to be rotatable around a rotational center P. An end surface of the detection body 30c is roughly square or rectangular. As can be understood from FIG. 5B, first to fourth magnetic detection units 34a to 34d, which are rotationally symmetrically arranged around the rotational center P, are arranged on one end surface of the detection body 30c.

Figure 5C:
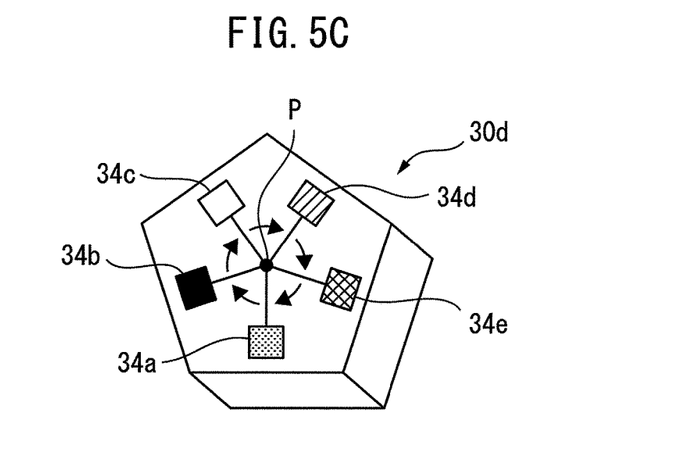
FIG. 5C is an enlarged view illustrating still yet another detection body according to the first embodiment.

Similarly, FIG. 5C illustrates still yet another detection body 30d formed into a pentagonal pole to be rotatable around a rotational center P. An end surface of the detection body 30d is roughly equilateral-pentagonal. As can be understood from FIG. 5C, first to fifth magnetic detection units 34a to 34e, which are rotationally symmetrically arranged around the rotational center P, are arranged on one end surface of the detection body 30d.

The detection bodies 30b to 30d are arranged in an installation place H in place of the detection body 30a. When a rotational angle of a detected object including a different size of pitch is detected, the detection bodies 30b to 30d are arranged in the installation place H in a direction for using a magnetic detection unit according to the pitch of the detected object. This enables appropriate detection of the rotational angle of the detected object. The detection bodies 30b to 30d can deal with much more detected objects including concave and convex parts at different pitches than the detection body 30a. Needless to say, other polygonal-pole or polygonal detection bodies rotatable around a rotational center P are within the scope of the present invention.

Figure 6:
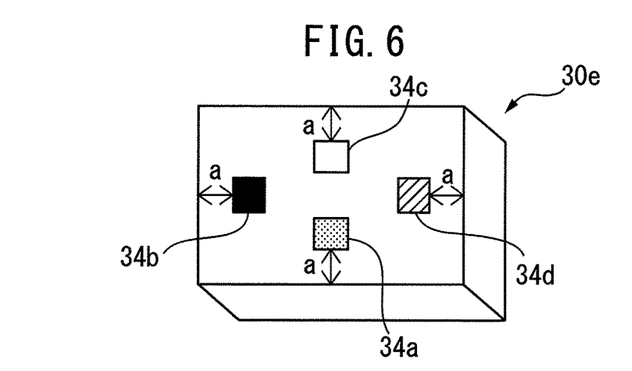
FIG. 6 an enlarged view illustrating a detection body according to a second embodiment of the present invention.

FIG. 6 is an enlarged view illustrating a detection body according to a second embodiment of the present invention. The detection body 30e illustrated in FIG. 6 is a square pole, and an end surface thereof is rectangular. First to fourth magnetic detection units 34a to 34d are arranged on one end surface of the detection body 30e. As can be understood from FIG. 6, the first and third magnetic detection units 34a and 34c are arranged on long sides of the end surface. The second and fourth magnetic detection units 34b and 34d are arranged on short sides of the end surface.

The magnetic detection units 34a to 34d are arranged adjacently to respective edges of the end surface of the detection body 30e. As can be understood from FIG. 6, distances between the magnetic detection units 34a to 34d and the edges corresponding to the respective magnetic detection units are predetermined distances a. The magnetic detection units 34a to 34d are positioned corresponding to centers of the corresponding long or short sides.

Figure 7A:
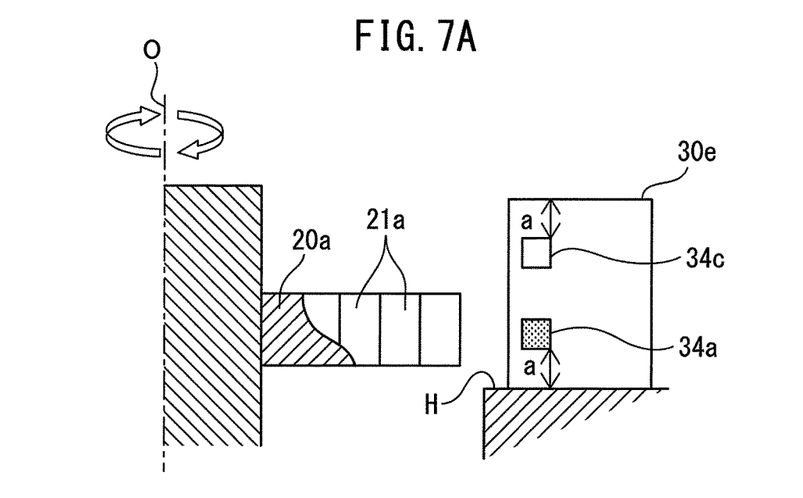
FIG. 7A is a partial enlarged view illustrating a first application example of the magnetic angle detector according to the second embodiment.

FIG. 7A is a partial enlarged view illustrating a first application example of a magnetic angle detector according to the second embodiment. As illustrated in FIG. 7A, in the first application example, a rotational angle of a detected objet 20a that includes a plurality of concave and convex parts 21a formed at the first pitch is detected. The detection body 30e is disposed in an installation place H so that only the first magnetic detection unit 34a can face a peripheral surface of the detected object 20a. In other words, the detection body 30a is disposed in the installation place H in a manner that the edge of the end surface of the detection body 30e corresponding to the first magnetic detection unit 34a is set lower.

Accordingly, the first magnetic detection unit 34a can, as described above, detect a rotational angle of the detected object 20a by appropriately understanding a change of magnetic flux density when the detected object 20a rotates around a rotational axis O. Notably, in the first application example, the third magnetic detection unit 34c is located above the detected object 20a, thus giving no contribution to detection of the rotational angle of the detected object 20a. Similarly, the second and fourth magnetic detection units 34b and 34d are located slightly above the detected object 20a, thus giving no contribution to detection of the rotational angle of the detected object 20a.

Figure 7B:
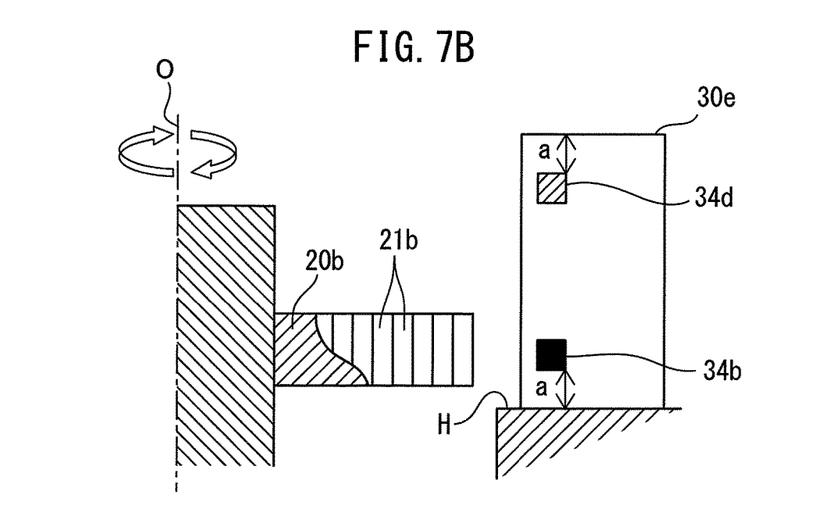
FIG. 7B is a partial enlarged view illustrating a second application example of the magnetic angle detector according to the second embodiment.

In a second application example, a rotational angle of a detected object 20b different from the detected object 20a is detected. In this case, the detected object 20a is removed to locate the detected object 20b on the rotational axis.

FIG. 7B is a partial enlarged view illustrating the second application example of the magnetic angle detector according to the second embodiment. As illustrated in FIG. 7B, a plurality of concave and convex parts 21b of the detected object 20b is disposed at the second pitch smaller than the first pitch of the detected object 20a. In the second application example, the detection body 30e is rotated anticlockwise by 90° from the state illustrated in FIG. 6. The detection body 30e is accordingly disposed in an installation place H in a manner that the arrangement is vertically opposite to that in the first application example. In other words, the detection body 30e is disposed in the installation place H in a manner that the edge of the end surface of the detection body 30e corresponding to the second magnetic detection unit 34b is set lower. As a result, only the second magnetic detection unit 34b faces a peripheral surface of the detected object 20b.

Accordingly, the second magnetic detection unit 34b can, as described above, detect a rotational angle of the detected object 20b by appropriately understanding a change of magnetic flux density when the detected object 20b rotates around the rotational axis O. Notably, in the second application example, the fourth magnetic detection unit 34d is located above the detected object 20b, thus giving no contribution to detection of the rotational angle of the detected object 20b. Similarly, the first and third magnetic detection units 34a and 34c are located slightly above the detected object 20b, thus not contributing to detection of the rotational angle of the detected object 20b.

Thus, according to the second embodiment of the present invention, the magnetic detection units 34a and 34b matched with the pitches of the plurality of concave and convex parts of the detected object to be detected by directing a specific edge of the detection body 30e downward adjacently to the installation place H. The same detection body 30e can accordingly be used even when detecting a rotational angle of the detected object 20b different in pitch of the plurality of concave and convex parts. This eliminates having to prepare a detection body including another magnetic detection unit even when the pitch of the plurality of concave and convex parts of the detected object is different. As a result, the number of manufacturing steps can be reduced, and component management can be simplified. Even when the specific edge of the detection body 30e is directed downward adjacently to the installation place H, positional relationship between the detected objects 20a and 20b and the end surface of the detection body 30e are equal to each other. This eliminates necessity of changing a fitting position of the detection body 30e.

Figure 8A:
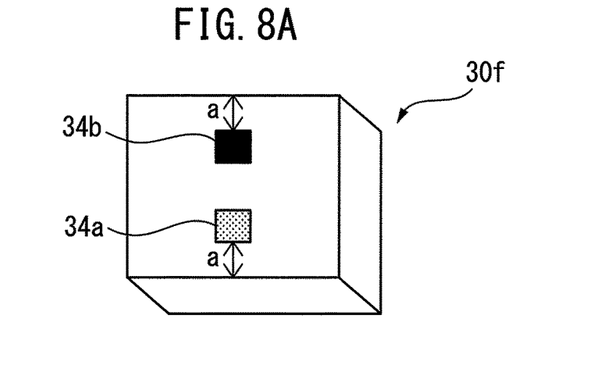
FIG. 8A is an enlarged view illustrating another detection body according to the second embodiment.

FIG. 8A is an enlarged view illustrating another detection body according to the second embodiment. The detection body 30f is formed into a square pole. An end surface of the detection body 30f is rectangular, or may be roughly square. As can be understood from FIG. 8A, first and second magnetic detection units 34a and 34b are arranged on one end surface of the detection body 30f. As in the aforementioned case, distances between the magnetic detection units 34a and 34b and the edges of the end surface of the detection body 30f corresponding to the respective magnetic detection units are predetermined distances a.

Figure 8B:
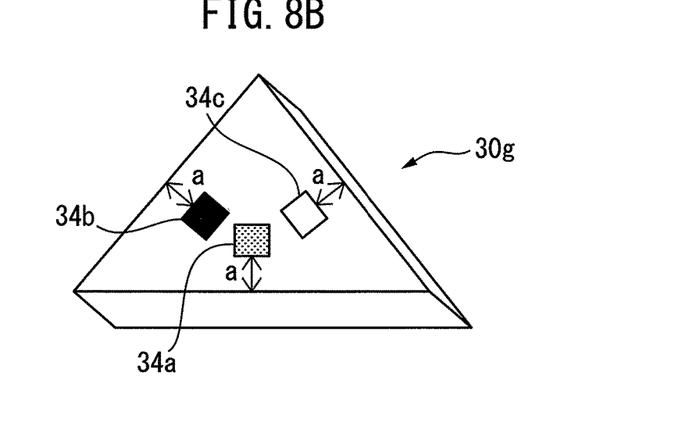
FIG. 8B is an enlarged view illustrating yet another detection body according to the second embodiment.

Similarly, FIG. 8B illustrates yet another detection body 30g formed into a triangle pole. An end surface of the detection body 30g is triangular, or may be roughly equilateral-triangular. As can be understood from FIG. 8B, first to third magnetic detection units 34a to 34c are arranged on one end surface of the detection body 30g. As in the aforementioned case, distances between the magnetic detection units 34a to 34c and the edges of the end surface of the detection body 30g corresponding to the respective magnetic detection units are predetermined distances a.

Figure 8C:
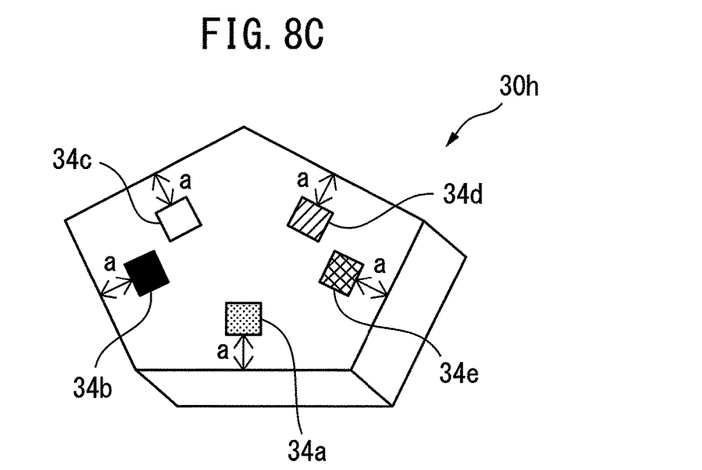
FIG. 8C is an enlarged view illustrating still yet another detection body according to the second embodiment.

Similarly, FIG. 8C illustrates still yet another detection body 30h formed into a pentagonal pole. An end surface of the detection body 30h is pentagonal, or may be roughly equilateral-pentagonal. As can be understood from FIG. 8C, first to fifth magnetic detection units 34a to 34e are arranged on one end surface of the detection body 30h. As in the aforementioned case, distances between the magnetic detection units 34a to 34e and the edges of the end surface of the detection body 30h corresponding to the respective magnetic detection units are predetermined distances a.

The detection bodies 30f to 30h are arranged in an installation place H in place of the detection body 30e. When a rotational angle of a detected object 20 including a different size of pitch is detected, the detection bodies 30f to 30h are arranged in the installation place H in a direction for using a magnetic detection unit according to the pitch of the detected object. This enables appropriate detection of the rotational angle of the detected object. The detection bodies 30g and 30h can deal with much more detected objects including concave and convex parts at different pitches than the detection body 30e. Needless to say, other polygonal-pole or polyhedral detection bodies are within the scope of the present invention.

Figure 9A:
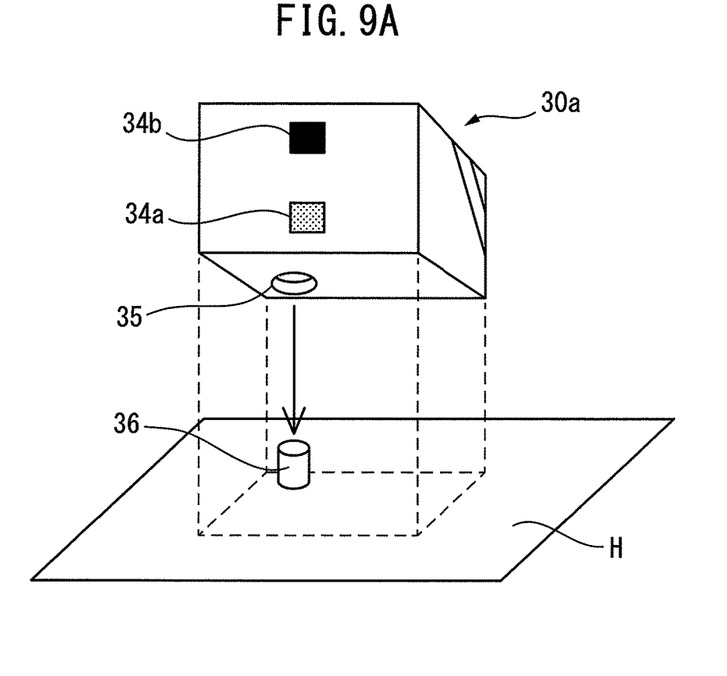
FIG. 9A is a perspective view illustrating a certain detection body and an installation surface according to the present invention.
Figure 9B:
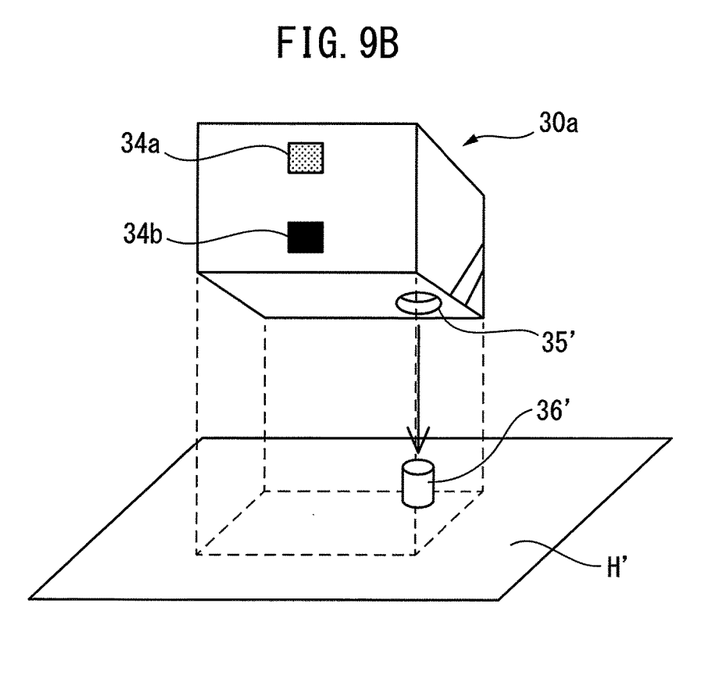
FIG. 9B is another perspective view illustrating the certain detection body and the installation surface according to the present invention.

FIGS. 9A and 9B are perspective views illustrating a certain detection body and an installation surface according to the present invention. FIG. 9A or the like illustrates a state where, for example, a detection body 30a is disposed in an installation place H. A broken line on the installation place H illustrated in FIG. 9A or the like indicates a predetermined place for disposing the detection body 30a.

As illustrated in FIG. 9A, a hole 35 is formed on one side surface of the detection body 30a adjacent to a magnetic detection unit 34a. The hole 35 is formed at one corner of the one side surface of the detection body 30a. A projection 36 corresponding to the hole 35 is formed in the installation place H.

When the hole 35 of the detection body 30a is fitted around the projection 36, the magnetic detection unit 34a of the detection body 30a faces a peripheral surface of the detected object 20a (not illustrated in FIG. 9A). The detection body 30a is accurately positioned by the hole 35 and the projection 36. Thus, a rotational angle of the detected object 20a can be accurately detected.

To detect a rotational angle of the other detected object 20b, the detection body 30a is removed to be moved to another installation place H'. As illustrated in FIG. 9B, a hole 35' is formed on the other side surface of the detection body 30a adjacent to a magnetic detection unit 34b. The hole 35' is formed at one corner of the other side surface of the detection body 30a. A projection 36' corresponding to the hole 35' is formed in the installation place H'.

Similarly, when the hole 35' of the detection body 30a is fitted around the projection 36', the magnetic detection unit 34b of the detection body 30a faces a peripheral surface of the detected object 20b (not illustrated in FIG. 9B). The detection body 30a is accurately positioned by the hole 35' and the projection 36'. Thus, the rotational angle of the detected object 20b can be accurately detected. Apparently, the holes 35 and 35' and the projections 36 and 36' serve to locate the detection body 30a in an appropriate place in an appropriate direction.

Figure 10A:
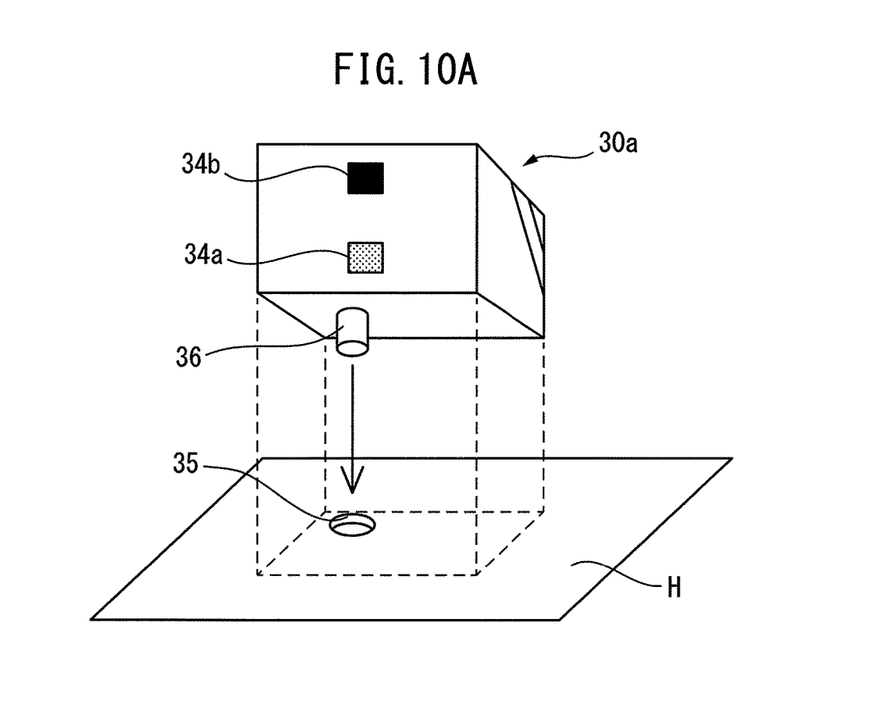
FIG. 10A is a modified example of FIG. 9A.
Figure 10B:
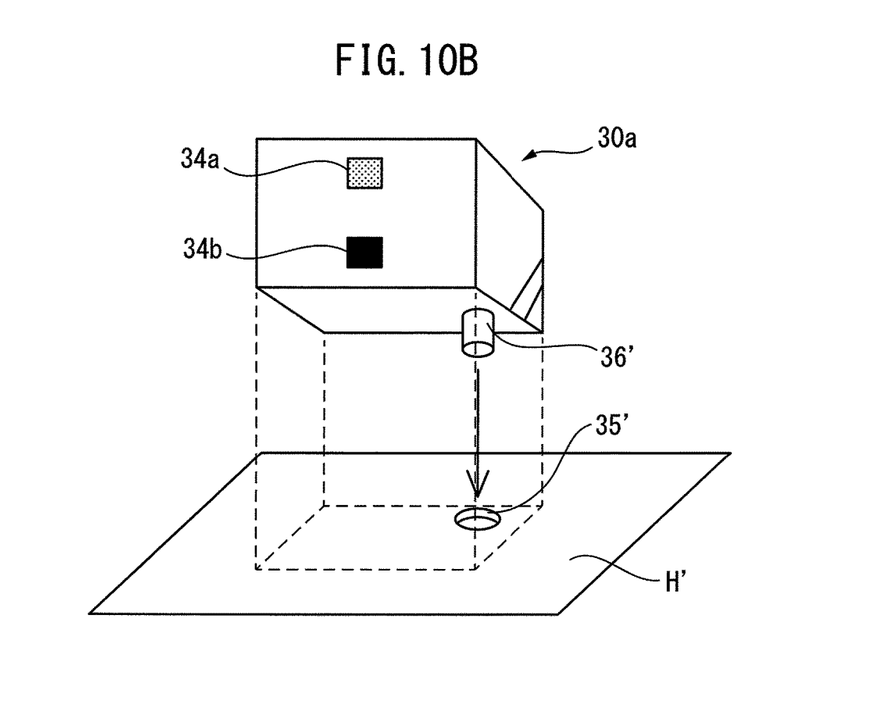
FIG. 10B is a modified example of FIG. 9B.

FIGS. 10A and 10B are modified examples of FIGS. 9A and 9B respectively. In FIGS. 10A and 10B, projections 36 and 36' are formed in the detection body 30a, and holes 35 and 35' are formed in the installation place H'. Even in such a case, effects similar to those described above can be provided as obvious to those skilled in the art.

EFFECTS OF THE INVENTION

According to the first aspect of the present invention, magnetic detection units matched with a pitch of a plurality of concave and convex parts of a detected object to be detected by rotating a detection body around an axis can be employed. The same detection body can accordingly be used even when detecting a rotational angle of a detected object different in pitch of a plurality of concave and convex parts. This eliminates necessity of preparing a detection body including another magnetic detection unit even when a pitch of a plurality of concave and convex parts of a detected object is different. As a result, the number of manufacturing steps can be reduced, and component management can be simplified. Even when the detection body rotates around the axis, positional relationship between the detected objects and the plane of the detection body are equal to each other. This eliminates necessity of changing a fitting position of the detection body.

According to the second aspect of the present invention, when a detection body is fitted to an installation place, for example, housing, the detection body can be disposed in an appropriate place in an appropriate direction.

According to the third aspect of the present invention, magnetic detection units matched with a pitch of a plurality of concave and convex parts of a detected object to be detected by directing a specific edge of a detection body downward adjacently to an installation place can be employed. The same detection body can accordingly be used even when detecting a rotational angle of a detected object different in pitch of a plurality of concave and convex parts. This eliminates having to prepare a detection body including another magnetic detection unit according to a different pitch of a plurality of concave and convex parts of the detected object. As a result, the number of manufacturing steps can be reduced, and component management can be simplified. Even when the specific edge of the detection body is directed downward adjacently to the installation place, positional relationship between detected objects and a plane of the detection body are equal to each other. This eliminates having to change a fitting position of the detection body.

According to the fourth aspect of the present invention, when a detection body is fitted to an installation place, for example, housing, the detection body can be disposed in an appropriate place in an appropriate direction.

The exemplary embodiments of the present invention have been described. Various changes, modifications, and additions understandable to those skilled in the art can be made without departing from the spirit and scope of the present invention.

What is claimed is:

1. A magnetic angle detector comprising:
   detection body which is a polyhedron, and at least two magnetic detection units are arranged on one plane of the polyhedron symmetrically around an axis of the detection body,
   wherein the first magnetic detection unit is configured to match a first detected object, a plurality of concave and convex parts are formed at a first pitch on a circumferential surface of the first detected object;
   wherein the second magnetic detection unit is configured to match a second detected object, a plurality of concave and convex parts are formed at a second pitch, which is smaller than the first pitch, on a circumferential surface of the second detected object;
   wherein a rotational angle of the first detected object is detected, when the first detected object rotates about an axis of rotation, the detection body is rotated about the axis of the detection body so that the first magnetic detection unit only faces the circumferential surface of the first detected object; and
   wherein a rotational angle of the second detected object is detected, when the second detected object rotates about the axis of rotation, the detection body is rotated about the axis of the detection body so that the second magnetic detection unit only faces the circumferential surface of the second detected object.

2. The magnetic angle detector according to claim 1, wherein a hole or a projection is formed on aside surface which is adjacent to the plane of the detection body on which the at least two magnetic detection units are arranged, and a projection or a hole corresponding to the hole or the projection is formed in an installation place where the detection body is installed.

3. The magnetic angle detector according to claim 1, wherein a magnetic detection unit matched with the detected object is employed by rotating the detection body around the arbitrary axis.

4. A magnetic angle detector comprising:
a detection body, which is a polyhedron,
wherein a first magnetic detection unit and a second magnetic detection unit are arranged on one plane of the detection body so that a distance between the first magnetic detection unit and an edge of the one plane corresponding to the first magnetic detection unit is equal to a distance between the second magnetic detection unit and another edge of the one plane corresponding to the second magnetic detection unit,
wherein the first magnetic detection unit is configured to match a first detected object, a plurality of concave and convex parts are formed at a first pitch on a circumferential surface of the first detected object;
wherein the second magnetic detection unit is configured to match a second detected object, a plurality of concave and convex parts are formed at a second pitch, which is smaller than the first pitch, on a circumferential surface of the second detected object;
wherein a rotational angle of the first detected object is detected, when the first detected object rotates about an axis of rotation, the detection body is rotated on an installation place so that the first magnetic detection unit only faces the circumferential surface of the first detected object; and
wherein a rotational angle of the second detected object is detected, when the second detected object rotates about the axis of rotation, the detection body is rotated on the installation place so that the second magnetic detection unit only faces the circumferential surface of the second detected object.

5. The magnetic angle detector according to claim 4, wherein a hole or a projection is formed on a side surface which is adjacent to the plane of the detection body on which the at least two magnetic detection units are arranged, and a projection or a hole corresponding to the hole or the projection is formed in an installation place where the detection body is installed.

* * * * *